W. M. Welling,
Harness Trimmings,
No. 37,941. Patented Mar. 17, 1863.

Witnesses;
S. Hiler
Thos. Geo. Harold

Inventor;
Wm. M. Welling

UNITED STATES PATENT OFFICE.

WILLIAM M. WELLING, OF NEW YORK, ASSIGNOR TO SAMUEL G. WELLING, OF NEW ROCHELLE, N. Y.

IMPROVEMENT IN RINGS FOR MARTINGALES.

Specification forming part of Letters Patent No. 37,941, dated March 17, 1863.

*To all whom it may concern:*

Be it known that I, WILLIAM M. WELLING, of the city and State of New York, have invented, made, and applied to use a certain new and useful Improvement in Rings for Martingales, &c.; and I do hereby declare that the following is a full, clear, and exact description of my said invention, reference being had to the annexed drawings, making part of this specification, wherein—

Figure 1:
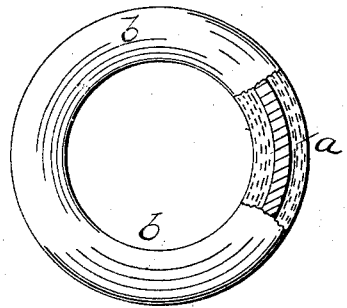
Figure 2:
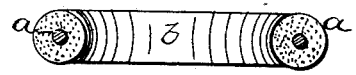

Figure 1 is a plan of said ring with a portion represented as broken open, and Fig. 2 is a cross-section of the same.

Similar marks of reference denote the same parts.

In Letters Patent granted to me August 4, 1857, a composition and mode of making factitious ivory is set forth, and out of said materials I have manufactured billiard-balls, rings of various kinds, &c.

My present invention does not relate to any particular composition, as that in the aforesaid patent or any similar compound may be employed.

The nature of my said invention consists in the employment of a metallic ring within a ring formed of artificial ivory, or similar material, for giving strength to the same, thereby producing a new article of manufacture, and one that is stronger than an ivory ring and possesses all the beauty of appearance, and can be afforded at a very much less cost.

Ivory rings, particularly such as used for martingales, require to be made out of very solid ivory in order to be sufficiently strong, and hence are quite costly.

In order to make my improved rings, I take a ring of metal, such as shown at *a*, or said ring may be formed by punching out a washer from a sheet of metal, or in any other suitable way. I take the amount of artificial ivory composition and by dies or by hand cause the said composition to completely envelop the said ring with as much uniformity as possible, as at *b*, and to give the exterior finish to the same, press and solidify the mass of composition around the ring by means of dies, and in so doing any plain or more or less ornamental shape may be given to the said ring or the surface thereof. My ring is thus made of the desired ornamental appearance, while great strength is attained at very little cost.

What I claim, and desire to secure by Letters Patent, is—

The ring for martingales, &c., manufactured as set forth, with a metal ring enveloped in composition, as and for the purposes specified.

As witness my signature this 28th day of April, 1862.

WM. M. WELLING.

Witnesses:
S. HILER,
THOS. GEO. HAROLD.